United States Patent [19]
Thompson

[11] Patent Number: 5,710,945
[45] Date of Patent: Jan. 20, 1998

[54] RESILIENT CAMERA MOUNT USABLE ON A HELICOPTER

[75] Inventor: Richard C. Thompson, Garden City, Mich.

[73] Assignee: McMahon Helicopter Services, Inc., Canton, Mich.

[21] Appl. No.: 674,819

[22] Filed: Jul. 3, 1996

[51] Int. Cl.[6] ............................................. C03B 29/00
[52] U.S. Cl. ........................................ 396/13; 396/7
[58] Field of Search ............... 354/74, 81, 293, 354/75, 76; 244/118.1; 396/429, 433, 421, 427, 428, 7, 13

[56] References Cited

U.S. PATENT DOCUMENTS

| | | |
|---|---|---|
| 4,397,069 | 8/1983 | Camossi .................... 29/173 |
| 5,093,677 | 3/1992 | McMahon .................. 354/74 |
| 5,184,521 | 2/1993 | Tyler ........................ 74/5.34 |
| 5,365,291 | 11/1994 | Maeda ...................... 354/74 |
| 5,374,012 | 12/1994 | Marchand et al. ........ 244/118.1 |
| 5,426,476 | 6/1995 | Fussell et al. ............ 354/74 |
| 5,531,403 | 7/1996 | Tyler ........................ 244/118.1 |

*Primary Examiner*—Howard B. Blankenship
*Assistant Examiner*—Nicholas J. Tuccillo
*Attorney, Agent, or Firm*—Charles W. Chandler

[57] ABSTRACT

A camera mounting mechanism is attachable to a helicopter to support and isolate an exterior camera against vibrational forces generated by the helicopter during flight maneuvers.

Individual shock absorbers are arranged in a ring pattern around a central axis of the mounting mechanism to absorb the vibrational forces.

4 Claims, 3 Drawing Sheets

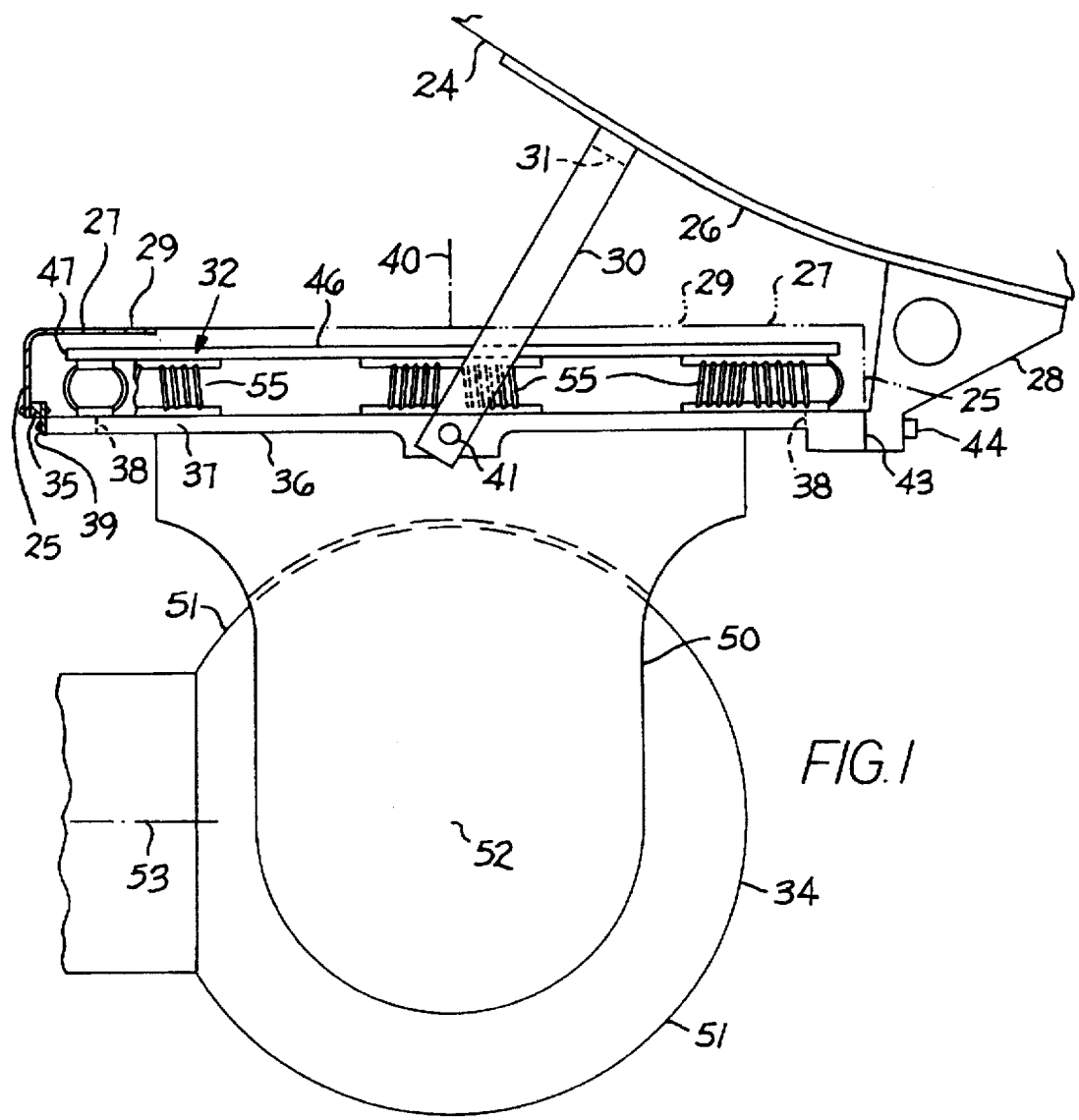
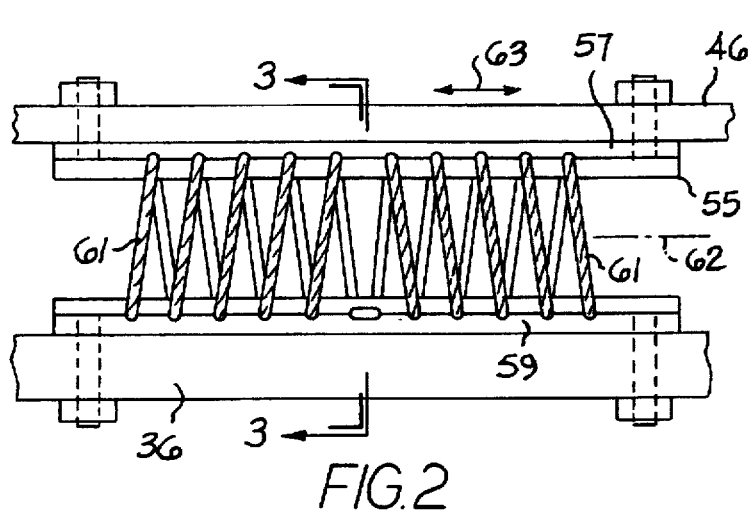
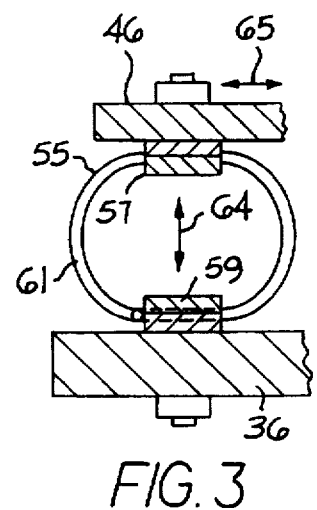
FIG.1
FIG.2
FIG.3

RESILIENT CAMERA MOUNT USABLE ON A HELICOPTER

BACKGROUND OF THE INVENTION

This invention relates to a mechanism for suspending a camera from the nose of a helicopter.

U.S. Pat. No. 5,093,677, issued to Brian McMahon on Mar. 3, 1992, discloses a mechanism for supporting a camera proximate the nose of a helicopter, whereby the camera can be used to take continuous video pictures of scenes below the flight path of the helicopter.

The camera referenced in U.S. Pat. No. 5,093,677 is internally stabilized so that vibrations generated by the helicopter and environmental elements such as wind forces do not adversely affect the camera lens system; the camera can produce relatively blur-free pictures in spite of the fact that the helicopter is affected by significant vibrational forces. However, the camera is relatively heavy, on the order of two hundred fifty pounds. The large camera weight requires a relatively complicated truss-type camera support system and counterbalance mechanism.

The present invention is concerned with a camera mount system usable with a relatively light camera that lacks isolation means for dampening air frame induced vibrations contemplated in U.S. Pat. No. 5,093,677. The camera mount system of the present invention includes an array of peripheral shock absorbers that isolate the camera from helicopter vibrations, such that a relatively light camera can be used, without sacrificing picture quality.

SUMMARY OF THE INVENTION

This invention relates to a mechanism for mounting a video camera underneath the nose of a helicopter, whereby the camera can be used to take continuous pictures of the scenery below the helicopter during flight. The mounting mechanism comprises an annular support ring suspended from the nose of the helicopter, and a camera mounting plate located above the support ring. The camera is suspended in the central space circumscribed by the support ring.

A principal feature of the invention is an array of shock absorbers interposed between the support ring and the camera mounting plate, such that vibrations generated by the helicopter and the environment are prevented from reaching the camera. The video output of the camera is relatively clear and sharp, in spite of the fact that the camera is carried by a helicopter that vibrates to a considerable extent during normal flight operations.

The shock absorbers are preferably spaced in an annular array on the support ring equi-distant from the central axis of the ring (that coincides with the vertical axis of the camera). The shock absorbers are oriented so as to collectively tune out the vibration-causing forces of the particular camera/helicopter configuration.

In the preferred practice of the invention, each shock absorber comprises an upper support bar attached to the camera mounting plate, a lower support bar attached to the annular support ring, and a shock-absorption cable wound in a helical fashion between the two bars. The cable is wound helically to provide an equal number of right hand turns and left hand turns, such that the cable acts somewhat like a set of resilient parallel links between the upper and lower bars.

Each cable helix has its helical axis tangent to an imaginary circle centered on the central vertical axis of the annular support ring. Also, most of the helical shock absorber cables are oriented for endwise movement in a plane essentially parallel to the plane of the path of the helicopter rotor.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is a side elevational view of a camera mounting mechanism embodying the invention;

FIG. 2 is an enlarged elevational view of a shock absorber used in the FIG. 1 camera mounting mechanism;

FIG. 3 is a transverse sectional view taken on line 3—3 in FIG. 2;

FIG. 6 illustrates a connection usable where the nose of the helicopter is too fragile to carry the load imposed by the camera and camera mount. FIG. 1 illustrates a connection usable where the nose of the helicopter has a relatively strong central beam having sufficient strength to carry the camera and camera mount load.

DESCRIPTION OF A PREFERRED EMBODIMENT OF THE INVENTION

Figure 5:
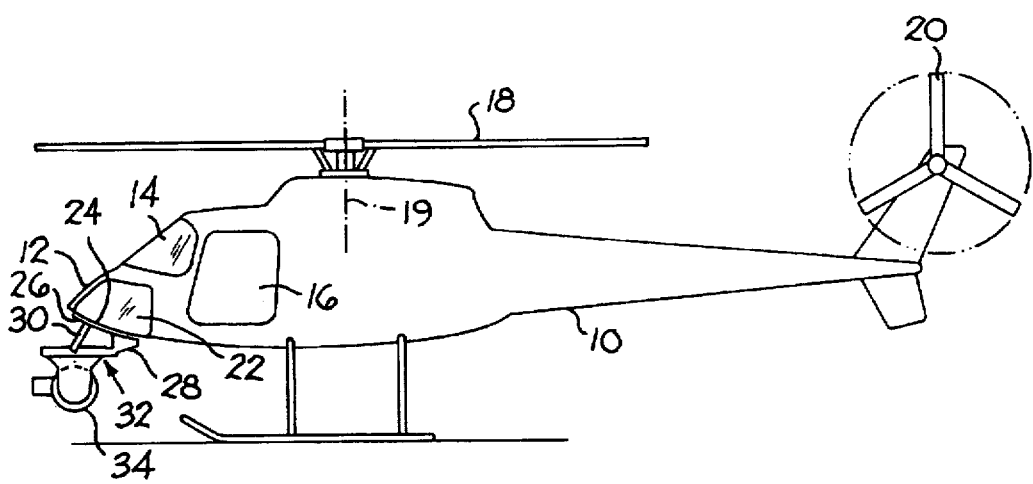
FIG. 5 shows the FIG. 1 camera mounting mechanism attached to the nose of a conventional helicopter. The mounting mechanism is shown on a greatly reduced scale, to illustrate the relationship of the mechanism to the helicopter.

FIG. 5 shows a helicopter 10 having a nose 12, front windshield 14, side door 16, main rotor 18, and tail rotor 20. This particular helicopter has two observation windows in the lower surface of nose 12, whereby the pilot can view terrain below the helicopter. In FIG. 5, one observation window is indicated by numeral 22; the other observation window is on the non-visible side of the helicopter nose.

The two observation windows 22, are separated by a beam 24 running along the underside of the nose 12 on the longitudinal centerline of the helicopter. For purposes of the present invention, beam 24 is used to attach the camera mount of the invention to the helicopter.

The attachment structure comprises a curved pad 26 bolted to beam 24, a rear bracket 28 extending downwardly from the pad, and two angled struts 30 extending from the front area of the pad downwardly to the camera mounting mechanism. Struts 30 are preferably integral parts of a U-shaped arm structure bolted to pad 26. The camera mounting mechanism is indicated by numeral 32. The camera is referenced by numeral 34.

FIGS. 1 through 4 illustrate features of the camera mounting mechanism 32, and its attachment to nose beam 24. The mechanism comprises an annular support ring 36 having an outer edge 37 and an inner circular edge 38 centered on a central vertical axis 40. Struts 30 are connected to flat side surfaces of ring 36 by bolts 41. Bracket 28 comprises two parallel walls extending from pad 26 to abut a flat rear surface 43 on ring 36. Bolts 44 connect the bracket walls to ring 36.

Figure 4:
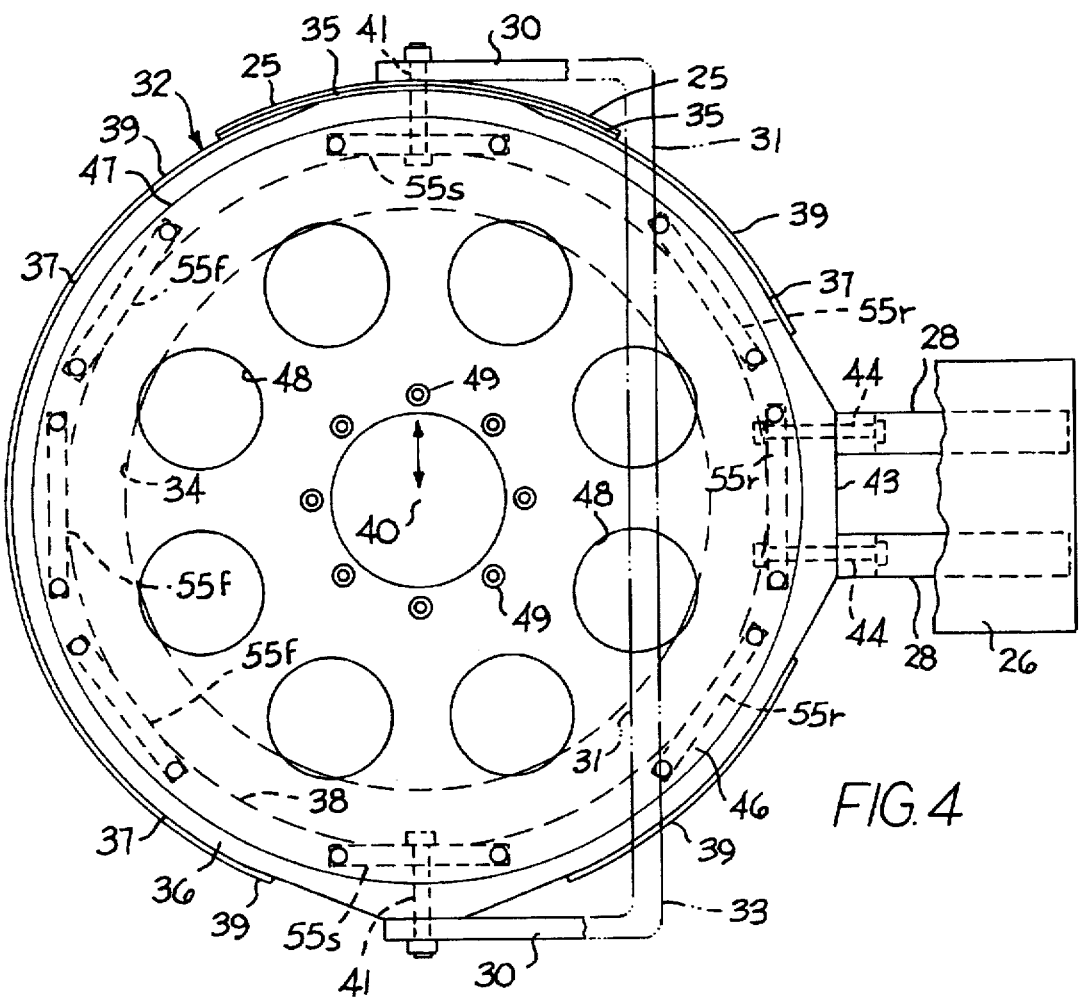
FIG. 4 is a top plan view of the camera mounting mechanism depicted in FIG. 1.

Support ring 36 is rigidly attached to the helicopter by means of pad 26, rear bracket 28, and struts 30. The struts are preferably integral parts of a U-shaped arm structure 33 that includes a transverse connector bar 31 attached to pad 26. In FIG. 4, transverse connector bar 31 is shown by dashed lines, to avoid obscuring other structural details of the camera mounting mechanism.

The camera mounting mechanism includes a circular mounting plate 46 located above ring 36, and having an outer circular edge 47. Video camera 34 is secured to the underside of plate 46 by a ring of attachment bolts 49 concentric around central axis 40. Plate 46 has a multiple number of holes 48 for weight reduction purposes.

Camera 34 can be a camera marketed by Aerial Films, Inc. of Morristown, N.J. under its designation "GyroCam 360". The camera comprises a cradle 50 that provides swivel mounting of the camera housing 51 around a transverse swing axis 52.

Additionally, the camera is rotatable around a central vertical axis that coincides with central axis 40 of support ring 36. An electrical cable means (not shown) leads from the camera into the cabin area of the helicopter, whereby a camera operator can remotely control the camera for adjustment around the two axes of adjustment. The camera lens has an optical axis 53, that determines the camera field of view. Typically, the camera weight is about seventy pounds.

A principal feature of the invention comprises a series of resilient shock absorbers 55 interposed between support ring 36 and mounting plate 46 equidistant from central axis 40. FIGS. 2 and 3 show the construction of a representative shock absorber; the shock absorbers are of identical construction.

As shown in FIGS. 2 and 3, shock absorber 55 comprises an upper metal bar 57 bolted to the underside of plate 46, a lower metal bar 59 bolted to the upper surface of support ring 36, and a multi-strand twisted steel cable 61 wound into a helical configuration so that each convolution of the helix is anchored to the two bars at diametrically spaced points on the respective convolution. Each support bar, 57 or 59, is split into half sections to facilitate attachment of the cable convolutions to the respective bars. The cable runs through grooves in the mating half sections.

The steel cable is wound helically so that half of the convolutions are of the left hand, and half of the convolutions are of the right hand. FIG. 2 shows the helical cable in the normal condition. The cable can deflect along helix axis 62, as indicated by arrow 63, so that bars 57 and 59 are offset while remaining parallel. When shock absorbers 55 are trained between ring 36 and plate 46, the arrow 63 motion is tangent to an imaginary circle centered on central axis 40. Also, the cable convolutions can compress in a vertical direction, as indicated by arrow 64. Additionally, the cable convolutions can roll or sway, normal to the helix axis, as indicated by arrow 65. These motions enable the individual shock absorbers to be arranged in a ring pattern around central axis 40, without hampering the ability of the shock absorbers to respond to vibrational loads that may not always be in the same direction.

It is believed that the major vibrational force is generated by the interaction of main rotor 18 and tail rotor 20. The main rotor tends to rotate the fuselage around the rotor axis 19 (FIG. 5) whereas the tail rotor 20 sets up a counteracting force opposing such rotation.

As shown In FIG. 4, eight shock absorbers 55 are arranged in a ring pattern around axis 40 to form the shock absorber system. Three of the shock absorbers 55f are oriented in the forward portion of ring 36. Three of the shock absorbers 55r are oriented in the rear portion of ring 36. The letters "f" and "r" are used here to indicate front and rear, respectively.

These six shock absorbers can move, or shift, in directions parallel to the respective helix axis 62, as indicated by arrow 63 in FIG. 2. As viewed in FIG. 4, the arrow 63 motion is tangent to an imaginary circle centered on central axis 40. The shock absorbers act generally in unison.

The remaining two shock absorbers, designated by numeral 55s are located on an imaginary transverse centerline separating the forward and rear portions of ring 36. The two shock absorbers have their helix axis oriented parallel to the longitudinal centerline of the helicopter. These shock absorbers can sway, or roll, as indicated by arrow 65 in FIG. 3.

Preferably the shock absorbers are arranged in diametrical pairs, as shown in FIG. 4. Thus, the two side shock absorbers 55s form one pair, and each of the front shock absorbers 55f forms a diagonal pair with one of the rear shock absorbers 55r. The three front shock absorbers 55f are relatively close together, and the three rear shock absorbers 55r are relatively close together compared to the spacings of shock absorbers 55f and r from shock absorbers 55s.

I have found that when the shock absorbers are differently spaced, in groups, as indicated by arrows 55f, 55r, and 55s, the shock absorber system tunes out the vibrational forces from reaching the camera lens; the video picture remains reasonably steady, without significant blur or distortion. When the shock absorbers were arranged in an even spacing around central axis 40, the picture quality was not as sharp or steady. It is believed that the improved picture quality is a result of the proper shock absorber grouping, as shown e.g. in FIG. 4. This grouping is considered to be a feature of the invention and depends on the particular camera/helicopter configuration.

In the preferred practice of the invention, camera support plate 46 is enclosed within a shroud that overlies the plate upper face and peripheral edge, whereby the plate is isolated from aerodynamic forces associated with the flight of the helicopter. The shroud also prevents contaminants from migrating into the shock absorber elements.

FIGS. 1 and 4 fragmentarily show a shroud construction that can be used to isolate plate 46 from the weather elements, i.e. wind, snow, rain, aerodynamic forces, etc. As shown in FIG. 1, the shroud comprises an inverted pan-shaped housing member 29 that includes a generally circular top wall 27 and a generally cylindrical side wall 25.

The shroud further comprises a cylindrical spacer ring 35 secured to the inner surface of side wall 25, and three segmental arcuate strips 39 secured to the inner surface of spacer ring 35. The shroud components 29, 35 and 39 are secured together, by rivets or other suitable fasteners, prior to installation of the shroud onto the camera mounting mechanism. The three arcuate strips 39 are circumferentially spaced so that when the individual strips 39 are attached to the circular outer edge 37 of support ring 36, as shown in FIG. 1, the strips will have a clearance with respect to the two struts 30 and the bracket 28.

The three segmental arcuate strips 29 can be secured to the outer edge of annular ring 36 by rivets or screws.

In the installed position of the shroud, annular spacer ring 35 has its lower edge coplanar with the upper surface of support ring 36 so that ring 35 overlies ring 36 at the three areas where ring 36 is joined to struts 30 and bracket 28. Cylindrical side wall 25 of the shroud fits within the space formed by struts 30 and bracket 28 so as to completely enclose the camera support plate 46.

FIG. 4 shows generally the discontinuous nature of segmental strips 39. The spacer ring 35 and shroud side wall 25 are shown fragmentarily in FIG. 4. In the actual construction, the shroud completely isolates camera support plate 46 from the weather elements. The shroud components are preferably formed out of rigid plastic materials.

Figure 6:
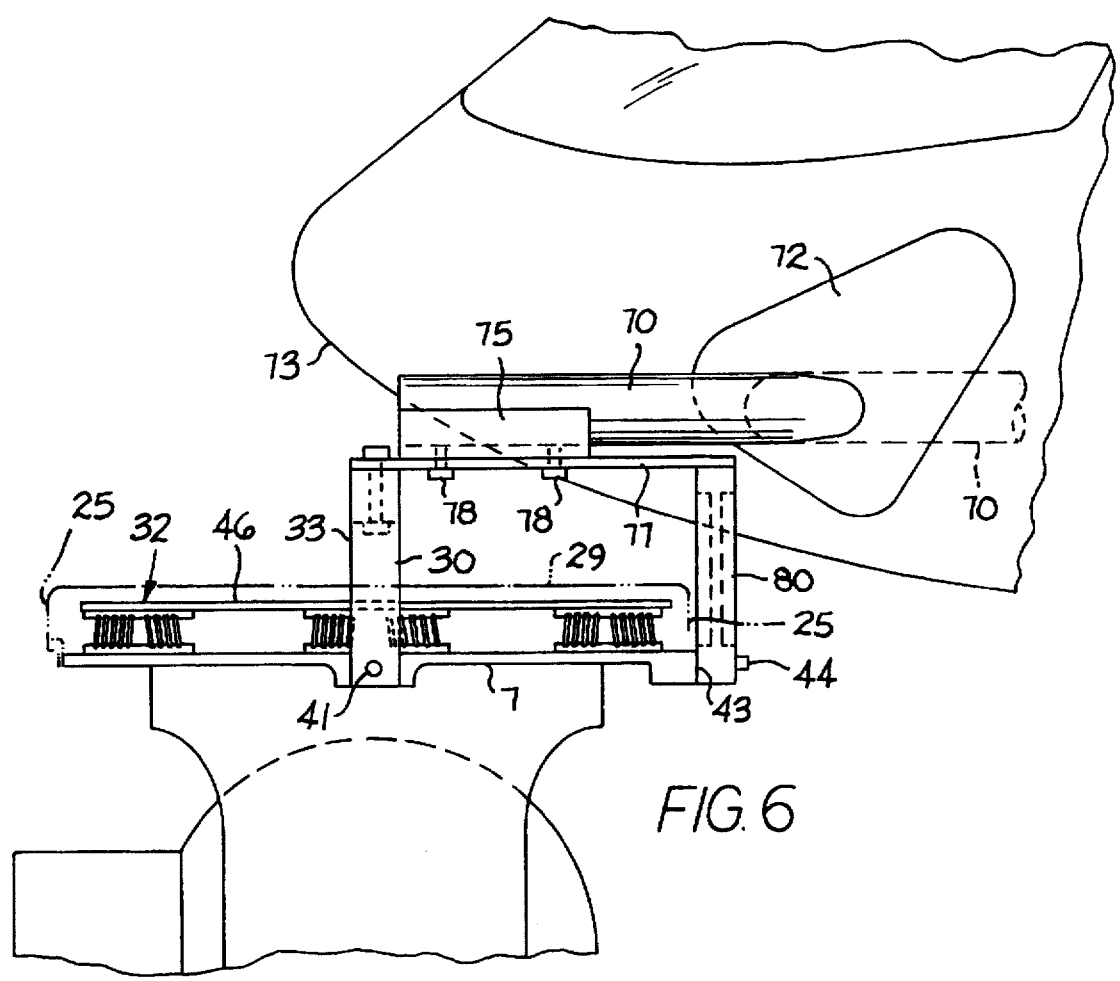
FIG. 6 shows the FIG. 1 camera mounting mechanism having a different type of connection to the helicopter.
Figure 7:
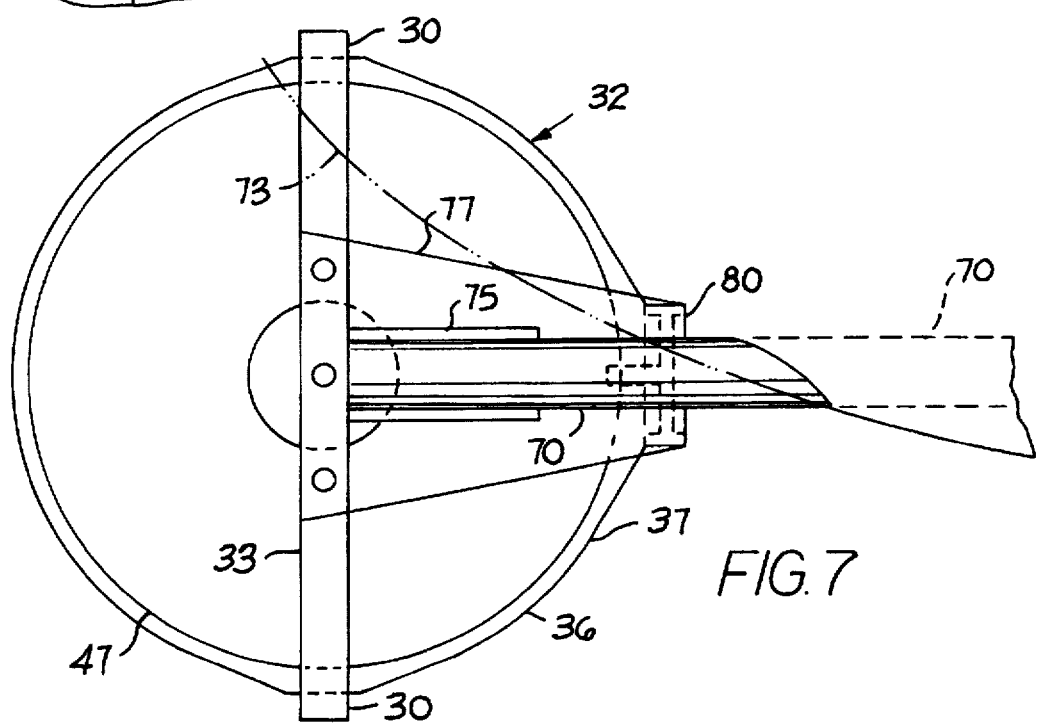
FIG. 7 is a top plan view of the mechanism shown in FIG. 6.

FIG. 1 shows a helicopter that is structured so that the camera mounting mechanism can be attached to the outer surface of the helicopter nose, i.e. beam 24. In some cases the helicopter nose is too fragile to permit direct attachment of the camera mounting mechanism to the nose surface. The camera mounting mechanism then has to be attached to the interior structural surfaces within the helicopter. FIGS. 6 and 7 show an attachment apparatus that can be used.

FIGS. 6 and 7 show an arrangement wherein a high strength steel tube 70 extends through an opening in a window 72 on the fuselage surface, such that the tube is located partly within the helicopter and partly outside the helicopter. The tube can be used to suspend the camera mounting mechanism 32 outside the helicopter in a cantilever fashion.

The right end portion of tube 70 within the helicopter is equipped with various mounting plates and brackets for rigidly attaching the tube to the structural floor of the helicopter. The left end portion of tube 70 is located outside the helicopter, i.e. exterior to the nose surface 73. In order to minimize the overall length of the tube, it is offset from the longitudinal axis of the helicopter fuselage.

Various types of attachment devices can be used to fasten the camera mounting mechanism 32 to suspension tube 70. As shown in FIGS. 6 and 7, the attachment system comprises a flat-surfaced bracket 75 welded, or otherwise attached, to tube 70. The bracket has four or more vertical bolts that extend through holes in a horizontal plate 77. Bolts 78 are threaded into threaded holes in the tube, so that plate 77 is rigidly affixed to bracket 75 and tube 70.

A front arm structure 33 (similar to, or identical with, arm structure 33 in FIGS. 1 and 4) is bolted to plate 77, to provide vertical struts 30 mated to side surfaces of annular support ring 36. A rear panel 80 is bolted to plate 77 so as to mate with the rear mounting surface 43 on annular ring 36.

The attachment structure shown in FIG. 6 and 7 enables the camera mounting mechanism of the present invention to be attached to interior structure elements of a helicopter that could not otherwise safely carry the exterior load. Typically, the exterior load will be less than one hundred pounds. Tube 70 can handle such a load.

The cantilever attachment mechanism shown in FIGS. 6 and 7 does not require any modifications to the camera mounting mechanism 32 or the associated shroud for plate 46. Thus, the camera mount and shroud can be used with the attachment mechanism of FIGS. 6 and 7. The camera mount-shroud assembly has a certain degree of versatility as regards to the mechanism for attached to different helicopters.

As noted earlier, the invention relates to camera mounting mechanism 32, and especially the shock absorber system for isolating the camera lens from vibrational forces generated by the helicopter during normal flight maneuvers.

Having described my invention, I claim:

1. A mechanism for mounting a camera underneath the nose of a helicopter, comprising:

an annular support ring having a vertical opening, a single central axis (40), a forward portion and a rear portion;

means for suspending said support ring from the nose of a helicopter;

a camera mounting plate located above said support ring;

multiple pairs of shock absorbers trained between said support ring and said camera mounting plate equidistant from said single central axis;

each of said pair of shock absorbers comprising a front shock absorber located on the forward portion of said support ring and a rear shock absorber located on the rear portion of said support ring;

the shock absorbers in each of said pairs being located on an imaginary straight line extending diagonally through said central axis;

each of said shock absorbers having a deflection capability in a first direction tangent to an imaginary circle centered on said single central axis, a second direction normal to the plane of the camera mounting plate, and a third direction parallel to the plane of the camera mounting plate, each of said shock absorbers comprising a single cable wound in a helical fashion creating a plurality of equally spaced turns to provide an equal number of right hand turns and left hand turns;

each cable helix having an axis that is tangent to an imaginary circle centered on said single central axis; and means disposed in the opening of the support ring and connected to the camera mounting plate for suspending a camera in a position below the support ring whereby the weight of the camera is entirely supported on the wound cables.

2. A mechanism as defined in claim 1, in which the single cable forms a continuous element wound in said left hand and right hand turns.

3. A mechanism for mounting a camera underneath the nose of a helicopter, comprising:

an annular support ring having a central opening, a forward portion, a rear portion, an imaginary transverse centerline separating said forward and said rear portions, and a single central axis (40);

means for suspending said support ring from the nose of a helicopter;

a camera mounting plate located above said support ring;

four pairs of shock absorbers trained between said support ring and said camera mounting plate equidistant from said single central axis;

the shock absorbers in three of the four pairs comprising a front shock absorber located on the forward portion of said support ring and a rear shock absorber located on the rear portion of said support ring;

the shock absorbers in the fourth pair being located on said imaginary transverse centerline;

the shock absorbers in each of said pairs being located on an imaginary straight line extending diagonally through said central axis;

each of said shock absorbers comprising a single cable wound in a helical fashion creating a plurality of equally spaced turns to provide an equal number of right hand turns and left hand turns;

each cable helix having an axis that is tangent to an imaginary circle centered on said central axis; and means disposed in the opening of the support ring and connected to the camera mounting plate for suspending a camera in a position below the support ring whereby the weight of the camera is entirely supported on the wound cables.

4. The mechanism of claim 3, wherein said shock absorbers are spaced circumferentially around said central axis so that the front and the rear shock absorbers in the first three pairs are relatively close together and relatively far apart from the shock absorbers in the fourth pair.

* * * * *